United States Patent

Wilson

[11] Patent Number: 5,949,576
[45] Date of Patent: Sep. 7, 1999

[54] REAR PROJECTION SCREEN MULTI-PANEL CONNECTION SYSTEM

[76] Inventor: Robert M. Wilson, 746 Cranberry Dr., Greenfield, Ind. 46140

[21] Appl. No.: 08/876,845

[22] Filed: Jun. 16, 1997

Related U.S. Application Data

[63] Continuation of application No. 08/410,796, Mar. 24, 1995, Pat. No. 5,613,145.

[51] Int. Cl.⁶ .................................................. G03B 21/56
[52] U.S. Cl. .......................... 359/449; 359/443; 359/460
[58] Field of Search .................................. 359/443, 449, 359/450, 453, 456, 459, 460

[56] References Cited

U.S. PATENT DOCUMENTS

| | | | |
|---|---|---|---|
| 3,841,045 | 10/1974 | Criswell | 52/395 |
| 3,992,841 | 11/1976 | Ward, Jr. | 52/309 |
| 4,254,600 | 3/1981 | Zwissler | 52/281 |
| 4,668,046 | 5/1987 | Yatabe et al. | 350/117 |
| 4,895,429 | 1/1990 | Iwahara et al. | 350/124 |
| 4,917,528 | 4/1990 | Shewchuk | 403/231 |
| 4,984,871 | 1/1991 | Martinez | 350/117 |
| 5,011,263 | 4/1991 | Hopper | 350/125 |
| 5,085,495 | 2/1992 | Iwahara et al. | 359/455 |
| 5,103,339 | 4/1992 | Broome | 359/443 |
| 5,400,178 | 3/1995 | Yamada et al. | 359/449 |

*Primary Examiner*—Daniel Malley
*Attorney, Agent, or Firm*—Baker & Daniels

[57] ABSTRACT

A rear projection screen assembly including a plurality of rear projection screen panels and a framing system for interconnecting the panels. Each of the panels includes an audience facing front surface and a rear surface upon which an image is projected. Selected perimeter edges of the panels include notches which are in registry with notches provided on the perimeter edges of adjacent panels when the panels are arranged in a screen-forming relationship. The framing system includes front brackets and rear brackets disposed along the notched edges of the panels at the panel front surfaces and rear surfaces respectively. Fasteners which extend through the notches in the panel edges connect the front bracket to the rear bracket such that the panels are secured between the brackets. The invention also provides an integrally formed fastener and bracket to facilitate assembly.

18 Claims, 7 Drawing Sheets

REAR PROJECTION SCREEN MULTI-PANEL CONNECTION SYSTEM

This is a continuation of application Ser. No. 08/410,796, filed Mar. 24, 1995 now U.S. Pat. No. 5,613,145.

BACKGROUND OF THE INVENTION

The present invention pertains to rear projection screens, and, in particular, to a rear projection screen formed of multiple panels which are interconnected by a framing system.

There are generally two types of projection screens utilized today. The first type is a front projection screen wherein the image is cast onto the screen from the same direction in which the image is viewed by an audience. The second type is a rear projection screen wherein the image is projected onto the rear surface of the screen relative to the location of the audience who view the image on the screen front surface. In many applications, rear projection screens are formed of multiple panels interconnected to form a contiguous viewing area. The multiple panels may be used to display multiple images or to display one large image, as materials commonly used in the industry may make impractical the manufacture of a sufficiently large single panel for a larger size screen.

In multi-panel screen construction, framing systems are used to interconnect screen panels in a screen-forming relationship. One known framing system disclosed in U.S. Pat. No. 5,103,339 employs front and rear bracket components which are connected with fasteners and which cooperate to sandwich opposing edge portions of adjacent rear projection screen panels. The straight edges of these sandwiched panel edge portions are spaced apart by the bracket fasteners disposed therebetween. Along their outer width portions, the facing surfaces of the front and rear bracket components frictionally engage the front and rear panel surfaces overlapped by the brackets to grip and maintain the panels in the assembled arrangement. However, the central width portion of the brackets at which the fasteners are located at longitudinally spaced intervals do not further hold the panels as no panel is situated therebetween to grip. Despite being highly effective, this framing system would be improved if the screen separating width of the front and rear bracket components could be reduced. In particular, although the sophisticated computer systems typically used to generate the data projected on multiple panel rear projection screens are essentially designed to produce visual images across the entire screen surface which appear seamless, i.e. none of the image is projected onto the framing system and therefore lost, the frame portion interrupts the continuity of the image. Therefore, reducing the physical separation of the images would assist an audience member in visually connecting the panel images. Furthermore, by reducing their width, the front bracket components would be even less visible to the audience when the screen is not being operated.

A wide assortment of still other framing systems have also been utilized in conjunction with rear projection screens. As aptly explained in U.S. Pat. No. 5,103,339, assigned to the assignee of the present invention, which is incorporated in its entirety herein by reference, these framing systems suffer from a variety of shortcomings which thereby reduce their desirability.

Thus, it is desirable to provide a multi-panel rear projection screen assembly having the advantages of the screen disclosed in U.S. Pat. No. 5,103,339 but which further allows for the reduction of the physical separation between images.

SUMMARY OF THE INVENTION

The present invention reduces the width of the framing system brackets utilized to maintain the rear projection screen in an installed position by notching the perimeter edges of the screen panels to accommodate the passage of bracket fasteners. As a result, the rear projection screen panels may be arranged with their perimeter edges flush, which in turn allows the central width portion of the frame brackets to be utilized to hold the panels in place. Because the frame bracket central width portions partially hold the panels in place, the outer width portions of the frame brackets may be smaller because less gripping force is required to be supplied thereby, and therefore the overall width of the frame brackets may advantageously be reduced.

In one form thereof, the present invention provides a rear projection screen assembly including a plurality of rear projection screen panels and a framing system for interconnecting the panels. Each of the panels includes an audience facing front surface, a rear surface upon which an image is projected, and edges, and the panels are arranged in a screen-forming relationship forming a contiguous viewing area with each panel having at least one edge proximate an edge of an adjacent panel. An edge of a first panel is flush with or in closely spaced relationship with an edge of a second panel. Each of these flush or closely spaced panel edges includes a notch in registry with the notch in the other edge, and these notches form a fastener passageway. The framing system includes framing members disposed along proximate edges of the panels, and one of the framing members includes a front bracket and a rear bracket. The front bracket is located at the front surfaces of the first and second panels at their flush or closely spaced edges, and the rear bracket is located at the rear surfaces of the first and second panels at their flush or closely spaced edges. The framing member also includes a fastener extending through the fastener passageway which connects the front bracket to the rear bracket such that the first and second panels are secured between the front and rear brackets.

In another form thereof, the present invention provides a rear projection screen assembly including a plurality of screen panels each including a rear surface, a front surface, and edges. The panels, which include a first panel and a second panel, are arranged in a screen-forming relationship providing a contiguous viewing area. A first panel edge is flush with or in closely spaced relationship with a second panel edge, and at least one of the first panel edge and the second panel edge includes fastener receiving notch means. The assembly also includes a framing system for mounting the panels in the screen-forming relationship. The framing system includes a front bracket, which is located along the front surface of the first and second panels at their bordering edges, and a rear bracket, which is located along the rear surfaces of the first and second panels at their bordering edges. The system also includes a fastener extending through the notch means that connects the front bracket to the rear bracket to secure the first and second panels between the front and rear brackets.

One advantage of the present invention is that the width of the frame bracket components may be reduced, thereby reducing the physical separation of images viewed on the rear projection screen panels.

Another advantage of the present invention is that bracket fasteners can be integrated into the brackets to facilitate assembly.

Still another object of the invention is to provide a multiple panel rear projection screen which is easy to install and which allows individual panels to be readily removed from the installed screen for servicing.

BRIEF DESCRIPTION OF THE DRAWINGS

The above mentioned and other advantages of this invention, and the manner of attaining them, will become more apparent and the invention itself will be better understood by reference to the following description of embodiments of the invention taken in conjunction with the accompanying drawings, wherein.

Figure 1:
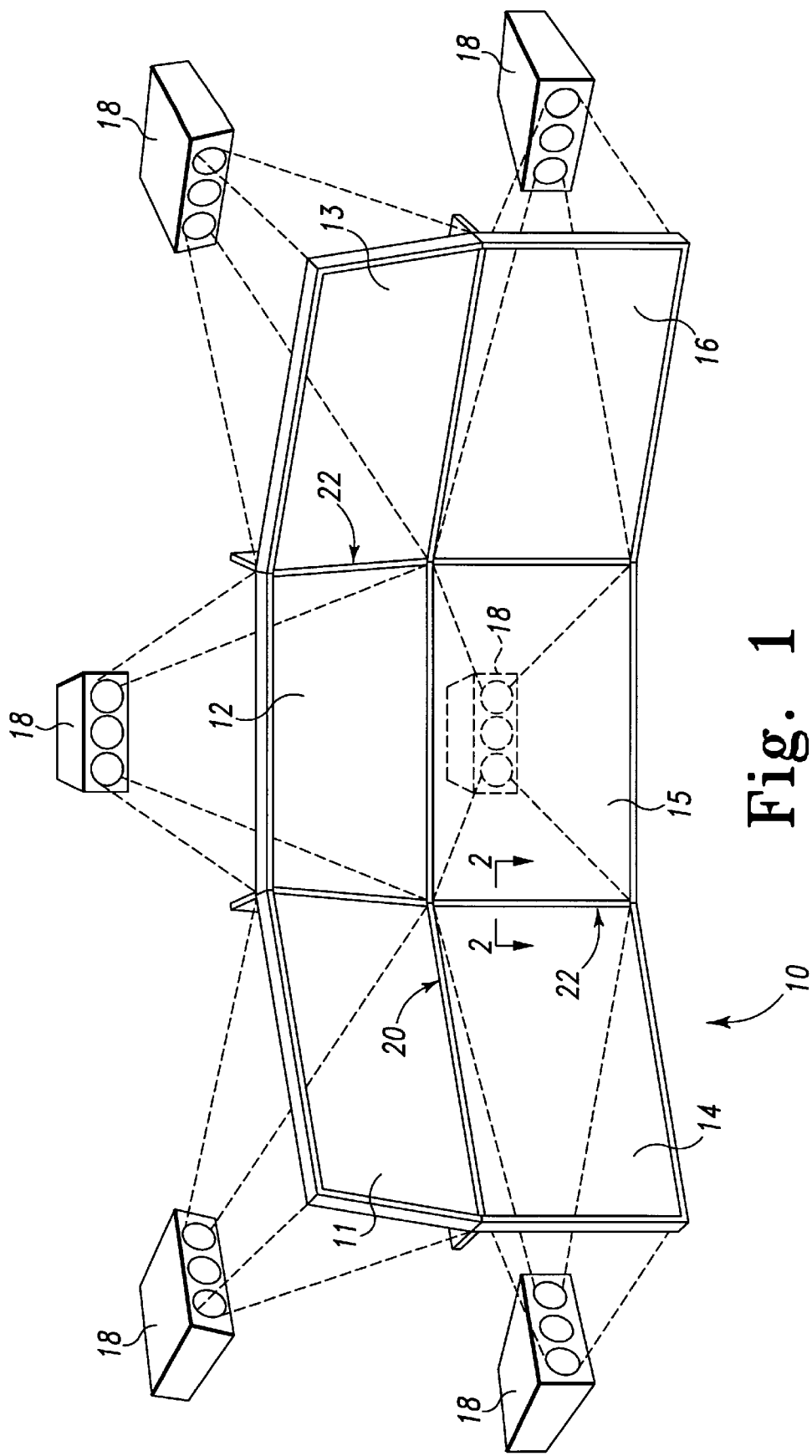
FIG. 1 is a front perspective view of one embodiment of an installed rear projection screen assembly configured according to the principles of the present invention.

Corresponding reference characters indicate corresponding parts throughout the several views. Although the drawings represent embodiments of the invention, the drawings are not necessarily to scale and certain features may be exaggerated in order to better illustrate and explain the present invention.

DESCRIPTION OF THE PREFERRED EMBODIMENTS

The embodiments disclosed below are not intended to be exhaustive or limit the invention to the precise form disclosed in the following detailed description. Rather, the embodiments are chosen and described so that others skilled in the art may better utilize the teachings of the invention.

Referring now to FIG. 1, there is diagrammatically shown a front perspective view of one embodiment of a rear projection screen assembly 10 constructed according to the principles of the present invention. Rear projection screen panels 11, 12, 13, 14, 15 and 16 are generally rectangularly shaped and are typically made from one-eighth to one-quarter inch thick acrylic or glass. Panels 11–16 are positioned in adjacent relationship as shown to form a contiguous viewing area. Although each of panels 11–16 is shown oriented at a slight angle relative to its respective adjacent panels, the screen-forming arrangement shown is merely one possible configuration. Other screen shapes and sizes, including planar or more panoramic configurations, may be provided within the scope of the invention. The perimeter edges of each panel 11–16 are arranged in close proximity to a facing perimeter edge of the other panels 11–16 adjacent thereto. In a manner known in the art, projectors 18 cast images on the rear surfaces of panels 11–16 which are visible along the front surfaces to an audience. In the embodiment of FIG. 1, the abstractly shown framing system which mounts panels 11–16 employs horizontal frame assemblies 20 r extending along the horizontal intersections of adjacent panels, and vertical frame assemblies 22, extending along the vertical intersections of adjacent panels. Frame assemblies 20 and 22 may be mounted to a perimeter frame (not shown) as is known in the art or to a supporting structure or wall in a room in which screen assembly 10 is installed.

Figure 2:
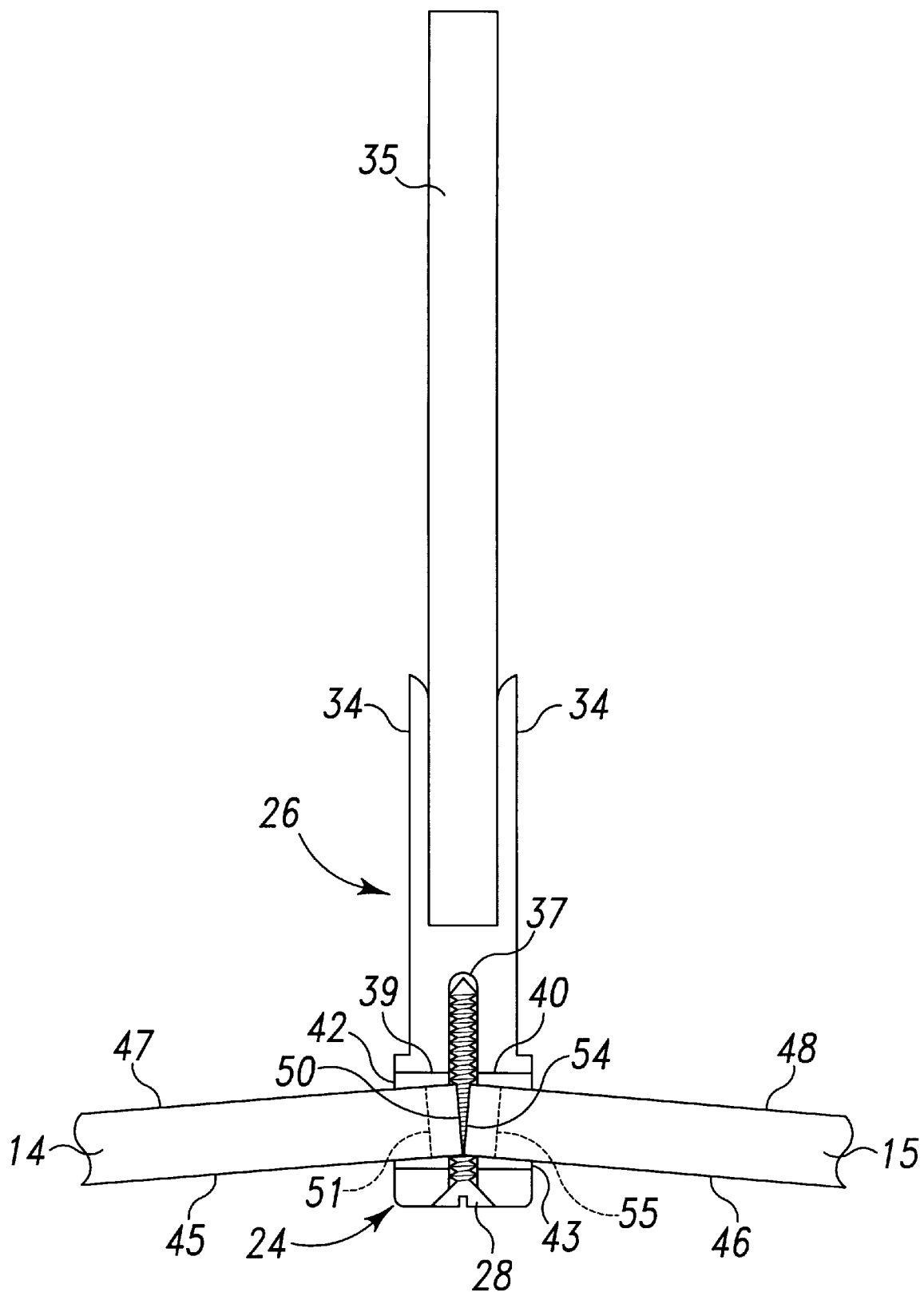
FIG. 2 is a sectional view, taken along line 2—2 of FIG. 1, showing a vertical frame assembly securing adjacent screen panels.

Referring now to FIG. 2, there is shown a cross-sectional view taken along line 2—2 in FIG. 1 of mullion or vertical frame assembly 22 used to secure screen panels 14 and 15. Portions of vertical frame assembly 22 and the complementarily notched panels 14, 15 are also shown in the exploded view of FIG. 3, wherein a portion of panel 14 is removed to further reveal the notching of the panel perimeter edges which permits a narrower bracket to be used as described below. Similar frame assemblies and panel notching may be employed along each of the other vertical panel intersections.

Frame assembly 22 includes front bracket or cap 24 and rear bracket 26 that are interconnected by longitudinally spaced fasteners 28 extending therebetween. Fasteners 28 may be screws as shown or otherwise formed as described further below. Front bracket 24 and rear bracket 26 may be made from clear or bronze anodized aluminum, such as 6063-T5 aluminum, and may be formed by an extrusion process. Other materials of construction, including durable materials such as acrylic or plastic, may also be employed within the scope of the invention. Front and rear brackets 24, 26 longitudinally extend continuously along the entire joint between panels 14, 15. The side-to-side width of front bracket 24, which corresponds to the horizontal dimension of bracket 24 which physically separates the visible portions of panels 14, 15, is in the range of about five-sixteenths to seven-eighths of an inch, and is preferably about five-sixteenths of an inch. The width of rear bracket 26 is similarly dimensioned.

Figure 3:
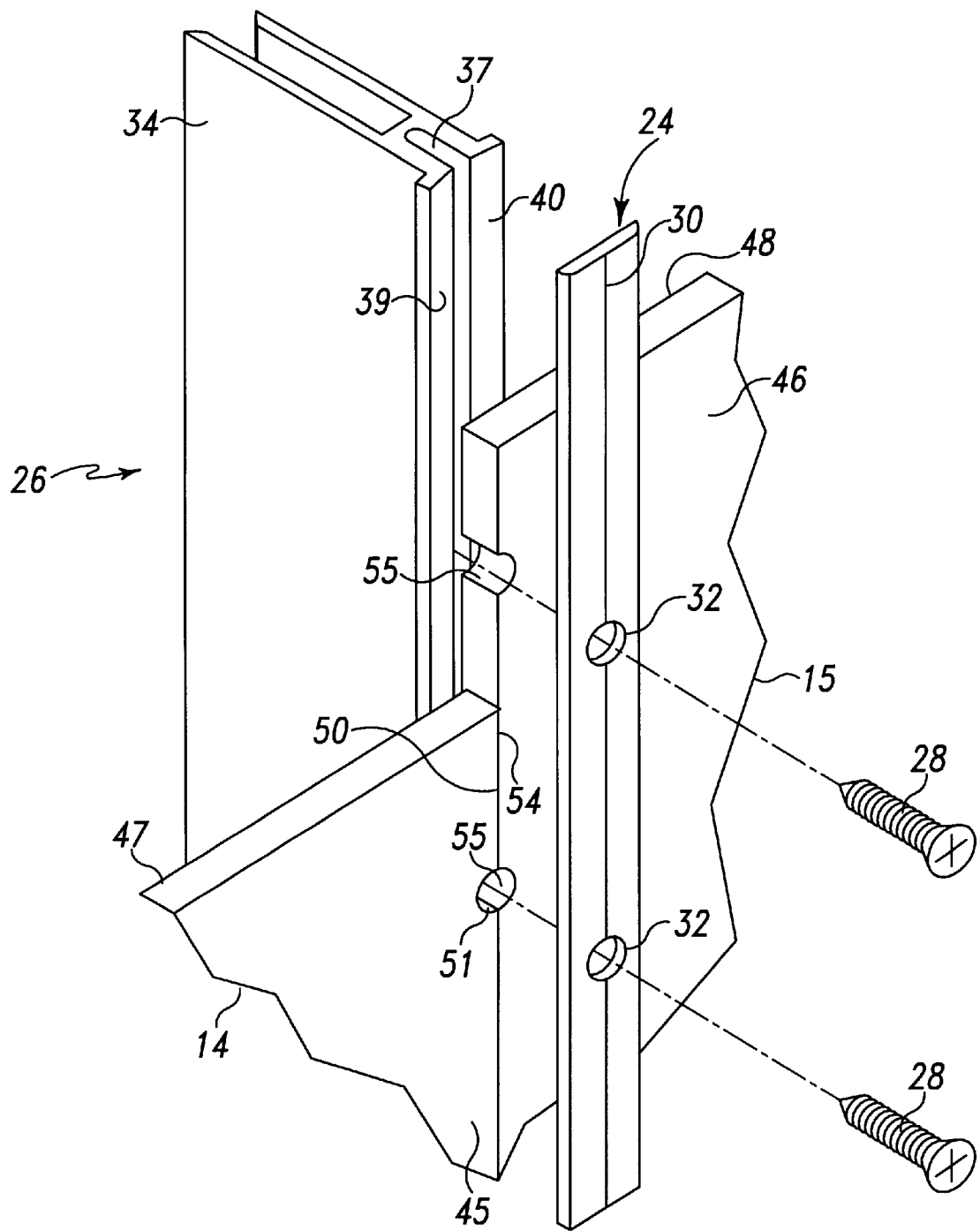
FIG. 3 is a fragmentary front perspective view of the components of FIG. 2 without the light-blocking fin and gaskets and with the screen panels shown coplanar, and wherein the components are shown in a partially exploded arrangement with a portion of one of the panels further removed to reveal the fastener receiving notches.

As best shown in FIG. 3, front bracket 24 includes a medial score 30 located on the bracket front surface. Medial score 30 aids in centering the countersunk bracket holes 32-drilled for screws 28. With sufficiently flat-headed pan screws, countersinking need not be provided. The hole formation preferably occurs at the manufacturing site such that anodization of the bracket can be subsequently performed.

Rear bracket 26 includes a longitudinally extending body from which rearwardly extend parallel flanges 34. As shown in FIG. 2, the cavity defined by flanges 34 accommodates a rearwardly extending, light-blocking aluminum fin 35 which aids in preventing an image intended to fall on one screen panel from falling on an adjacent panel. Fin 35 is attached to flanges 34 with transversely extending fasteners (not shown) which are secured flush with flanges 34 to avoid interrupting the image cast by a projector 18. Centrally located within the body of rear bracket 26 is longitudinally extending channel 37 into which screws 28 may be inserted at any point along the channel length. The front surface of rear bracket 26 includes first and second screen engaging surfaces 39, 40. Surfaces 39, 40 may be formed coplanar or possibly slightly forwardly angled at a variety of different angles selected by the manufacture to account for panel angling within a given screen assembly. For example, by angling each of first and second screen engaging surfaces 39, 40 forwardly at an angle of 2.5 degrees, projection screens 14, 15 may be accommodated at an offset angle of between about one to ten degrees. Although not shown, the outer corners of surfaces 39, 40 may be chamfered to better distribute the gripping forces applied to the held panels.

As shown in FIG. 2, resilient gaskets 42, 43, which may be made from a variety of materials such as neoprene or various vinyl and rubber compounds, are adhesively connected to the planar rear surface of front bracket 24 and the screen engaging surfaces 39, 40 of rear bracket 26. Gaskets 42, 43 provide for a more secure, non-slip grip on projection screens 14, 15 while protecting front surfaces 45, 46 and rear surfaces 47, 48 of panels 14, 15 from being scratched by direct contact with brackets 24 and 26. Gaskets 42, 43 further account for the range of possible panel angling for a given bracket configuration However, gaskets 42, 43 are not required as panels 14, 15 may be directly sandwiched between brackets 24 and 26.

Panel 14 includes a perimeter edge 50 which is proximate, and as shown in FIG. 3 preferably directly facing and in contact with, perimeter edge 54 of panel 15. Although panels 14, 15 are shown coplanar in this illustration such that perimeter edges 50 and 54 touch along their entire depth, the angled panel relationship illustrated in FIG. 2 wherein only the forward corners of edges 50, 54 may be brought close to contact or into abutting contact also yields edges which qualify as facing edges as defined herein. At spaced intervals along their lengths, perimeter edges 50, 54 include notches 51, 55 which are aligned when panels 14, 15 are arranged in the screen-forming relationship. Notches 51, 55 are preformed by the panel manufacturer, such as by punching or drilling operations known in the art.

As shown in FIGS. 2 and 3, notches 51, 55 permit the passage of screws 28 while allowing panels 14, 15 to be assembled with their perimeter edges 50, 54 either flush or in closely spaced relationship. As used herein, "closely spaced relationship" refers to a condition wherein part or all of the panel edges are arranged such that the smallest space therebetween is less than the thickness of the fastener thereat. Directly contacting edges are preferred, however, as more panel is thereby situated between the brackets for gripping thereby.

In the preferred embodiment shown, notches 51, 55 are mirror-images in both size and shape as well as semi-circularly shaped. This notch configuration allows the insertion of an equal amount of panels 14, 15 within frame assembly 22 such that the frictional grip achieved by front and rear brackets 24, 26 on both panels 14, 15 is equal. It will be appreciated that alternately shaped notches may be substituted in other embodiments. In addition, in some situations notches 51 could be differently sized than notches 55, or notches 51 could be large enough to receive the entire screw 28 such that notches 55 could be eliminated or vice versa. For the shown rear bracket 26 configuration having the centered fastener-receiving channel 37, this notch size discrepancy or notch elimination would result in the panel intersection being offset from the longitudinal centerline of the frame assembly 20. This panel offsetting would result in less gripping area being provided along the laterally displaced panel than the notched panel and the offset panel would be maintained with a lesser frictional force. However, modifying the rear bracket by offsetting the longitudinal channel from the shown centered arrangement or providing offset, individual fastener receiving cavities in a modified rear bracket could account for notch modifications and achieve the substantially equal gripping area and resulting holding force of the panels by the brackets.

During assembly shown in FIG. 3, screen panels 14, 15 are placed between front bracket 24 and rear bracket 26 such that notches 51, 55 are in registry and perimeter edges 50, 54 are in abutting contact. Fasteners 28 are screwed through holes 32, which are situated at locations corresponding to the notch arrangement, through gasket 43, through the passageway defined by notches 51, 55, through gasket 42, and into channel 37. The countersinking of holes 32 allows screws 28 to be flush with the front surface of front bracket 24.

It will be appreciated that fasteners 28 can be tightened down to compress the edge regions of panels 14, 15 between front and rear brackets 24, 26. The amount of the holding force can be adjusted by the level of tightening of screws 28 and the associated squeezing of the panels. As panels 14, 15 are abutting, the rear surface of front bracket 24 effectively frictionally engages the panels along the entire bracket width. The central width portion of front bracket 24 that extends longitudinally between holes 32 provides a gripping surface and a resulting holding force not provided in prior designs involving panel separation. Consequently, the outer width portions of frame bracket 24 are required to furnish less gripping area and associated holding force and can therefore be more narrow. A narrower width frame bracket is thereby achieved which physically separates front surfaces 45, 46 a lesser amount than prior, similarly designed frame brackets.

Figure 4:
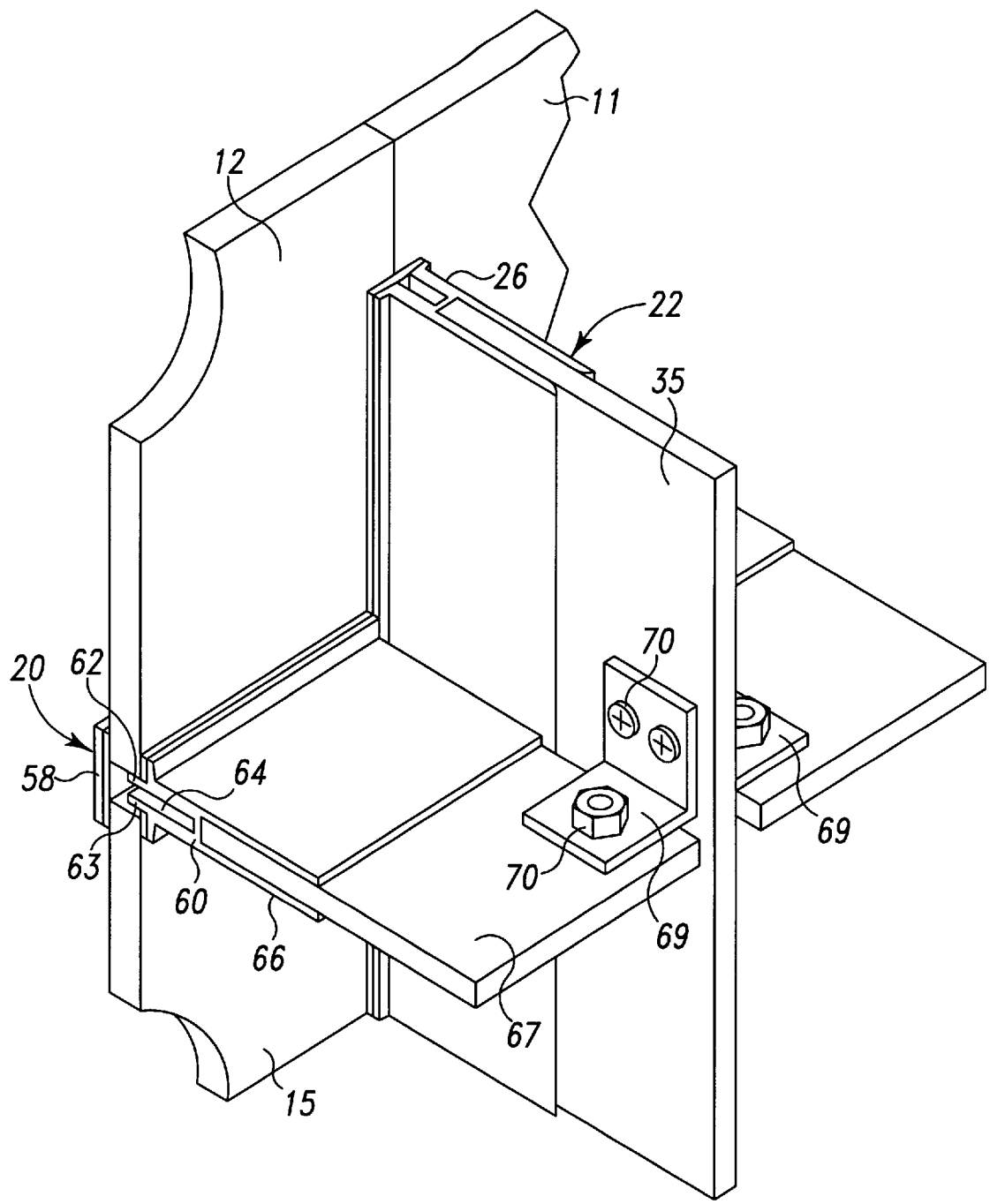
FIG. 4 is a fragmentary rear perspective view of the vertical frame assembly of FIG. 3 with a horizontal frame assembly and additional screen panels and fins attached thereto.

Referring now to FIG. 4, there is shown a rear perspective view of assembly lo of FIG. 1 but with the panels shown in a coplanar arrangement to facilitate the illustration. Panels 11 and 12, and 14 (not visible) and 15 are joined along their vertical, abutting edges by the framing assembly 22 illustrated in FIGS. 2 and 3. Framing assembly 22 preferably continuously extends to the top and bottom of screen assembly 10. Panels 12 and 15 are interconnected and supported along their bottom and top edges respectively by muntin or horizontal frame assembly 20 which continuously extend between vertical framing assemblies. A similar frame assembly for panels 11 and 14 is partially shown.

The shown horizontal frame assembly 20 is preferably used when the bottom edge of panel 12 and the top edge of panel 15 are straight or not notched. The gasket-lined horizontal front bracket 58 is configured similar to front bracket 24. The gasket-lined horizontal rear bracket 60 is configured similar to rear bracket 26, but further includes forwardly projecting, integral ribs 62, 63 disposed at the inward portion of the bracket forward surfaces and flanking fastener receiving channel 64. Ribs 62, 63, which extend continuously the length of bracket 60, serve as support ledges for panels 12, 15 to allow better weight distribution along the panel edge than would occur if the panel edges directly rested against the bracket fasteners. Rearwardly extending flanges 66 receives light-blocking fin 67.

Horizontal frame assembly 20 is joined to vertical frame assembly 22 by securing fin 67 to fin 35 with angle brackets 69 and suitable fasteners 70. As shown, a variety of different fasteners may be used, and angle brackets could alternatively be used to connect together rear brackets 26 and 60.

Alternate horizontal frame assemblies may also be employed within the scope of the invention. For example, a horizontal frame assembly sized and shaped similar to vertical frame assembly 22 may be used when the opposing edges of panels 12 and 15 are appropriately notched, and for such arrangements the opposite panel edges will be in abutting contact for distribution of the upper panel weight. In some situations, a bracket formed in one piece with U-shaped channels opening in opposite directions into which insert facing perimeter edges of upper and lower panels may be used, but such a bracket complicates panel removal.

Figure 5:
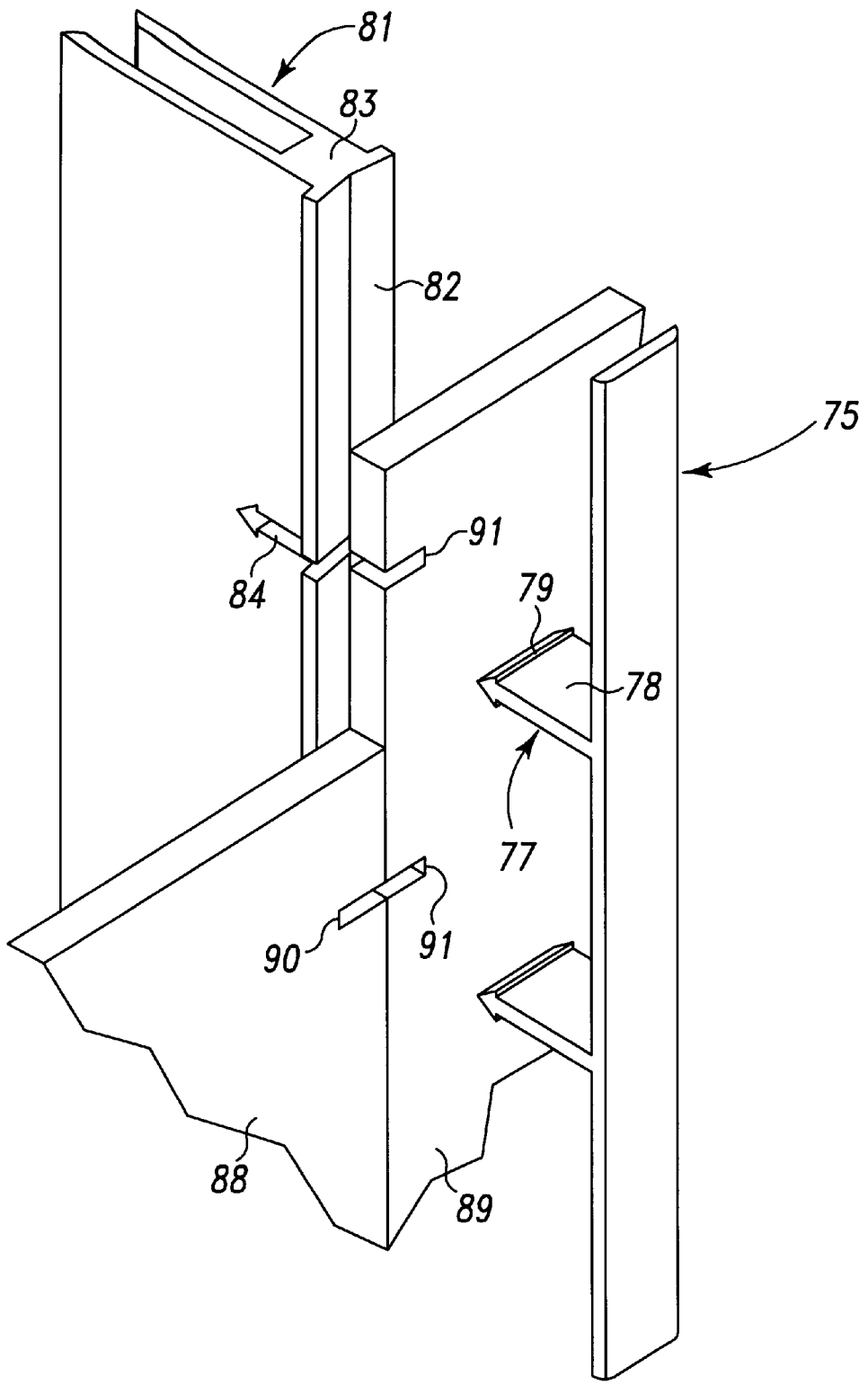
FIG. 5 is a fragmentary front perspective view of another embodiment of the present invention with integral bracket fasteners and notched panels.

Referring now to FIG. 5, there is shown a fragmentary, front perspective view of another embodiment of the present invention. Molded from acrylic or LexanW or other durable materials, or possibly formed from metal such as aluminum, front bracket 75 is integrally formed with fasteners 77 which include shank 78 and a toothed latch end 79. Integrating fasteners into the bracket advantageously reduces the time required for assembly. Rear bracket 81, which may be formed from the same materials as front bracket 75, includes front surface 82 against which panels 88, 89 are pressed by the rear surface of front bracket 75 during screen assembly. Transversely extending latching cavities 84 are provided in bracket body 83 and are shaped complementary to fasteners 77. During fastening, the upper and lower tips of latch end 79 snap into a locking engagement with the walls of cavity 84 to prevent fastener removal which would result in bracket separation. Slot-shaped notches 90, 91 provided in panels 88, 89 respectively allow passage of fasteners 77 while permitting the facing edges of panels 88, 89 to be in abutting contact when assembled.

It is recognized that fasteners 77 and latching cavities 84 may be variously configured as well as be cooperatively structured to allow brackets 75, 81 to be secured at different spaced relationships to effect an appropriate squeezing of panels 88, 89. In addition to different fastener shapes, alternate integral fastener arrangements are also within the scope of the invention. For example, although the depth of front bracket 75 would likely need to be increased in order to achieve fastener latching, the fasteners could be integrally formed with rear bracket 81.

Figure 6:
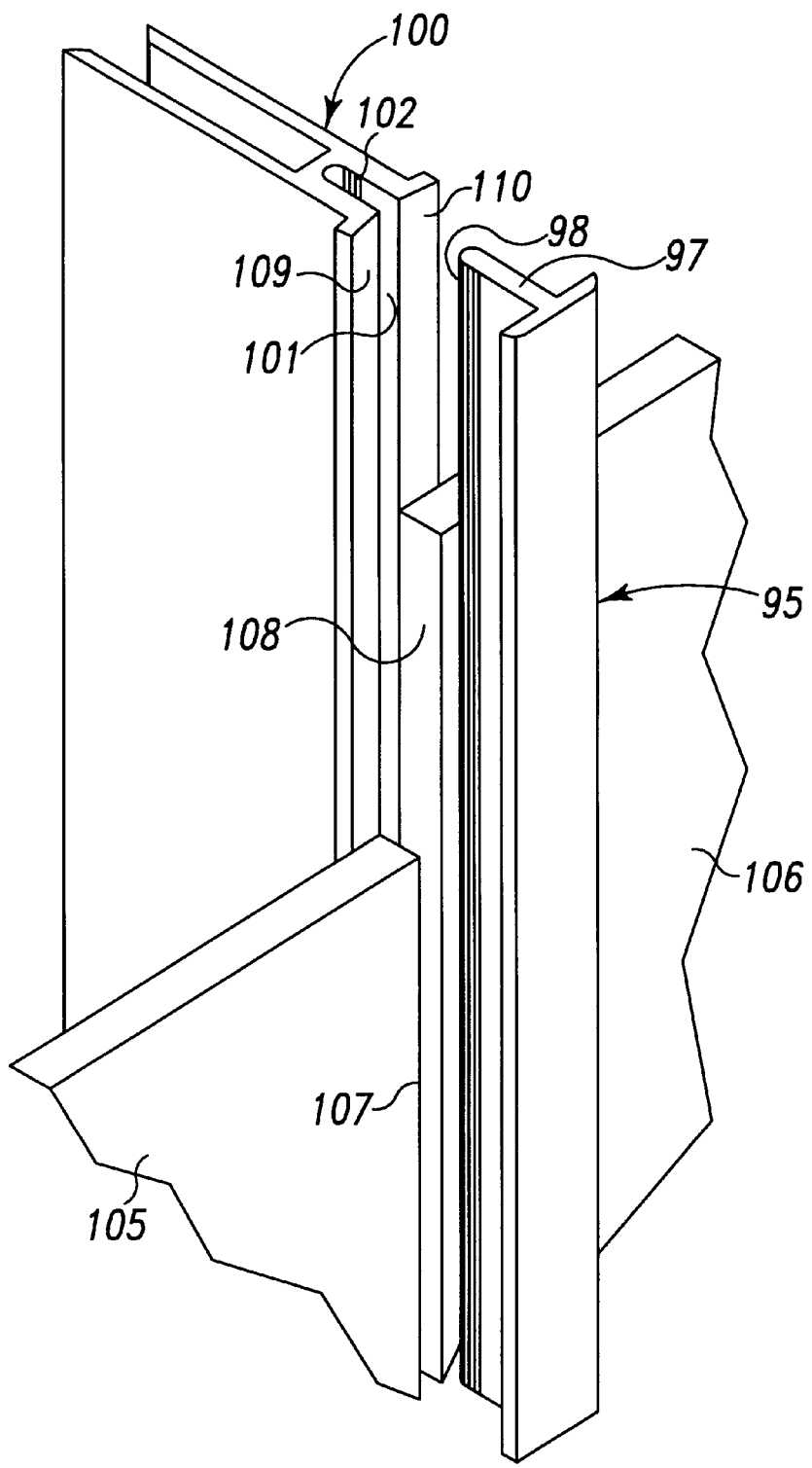
FIG. 6 is a fragmentary front perspective view of another embodiment with integral bracket fasteners.

Referring now to FIG. 6, there is shown another embodiment which facilitates installation of the screen assembly by integrally forming a fastening element into the front bracket. Front bracket 95 is formed by an extrusion process with a rearwardly extending flange 97 which runs the longitudinal bracket length and which serves as a bracket fastener. Alternative flange configurations, such as the continuous single flange being replaced with longitudinally oriented flange segments spaced at longitudinal intervals, may also be provided within the scope of the invention. Proximate its rearward tip, flange 97 includes a series of longitudinally extending, outwardly directed serrations or ribs 98. Rear bracket 100 includes channel 101 with serrations 102 provided along the channel wall surfaces that are structured and arranged to engage and interlock with fastener ribs 98 to secure brackets 95 and 100 together. Panels 105, 106 are shown including straight perimeter edges 107, 108 and are squeezed between bracket 95, 100 when screen assembly is complete. Other configurations of the rear bracket 100 including a narrower width with shorter panel engaging surfaces than surfaces 109, 110 shown may be provided within the scope of the invention.

Figure 7:
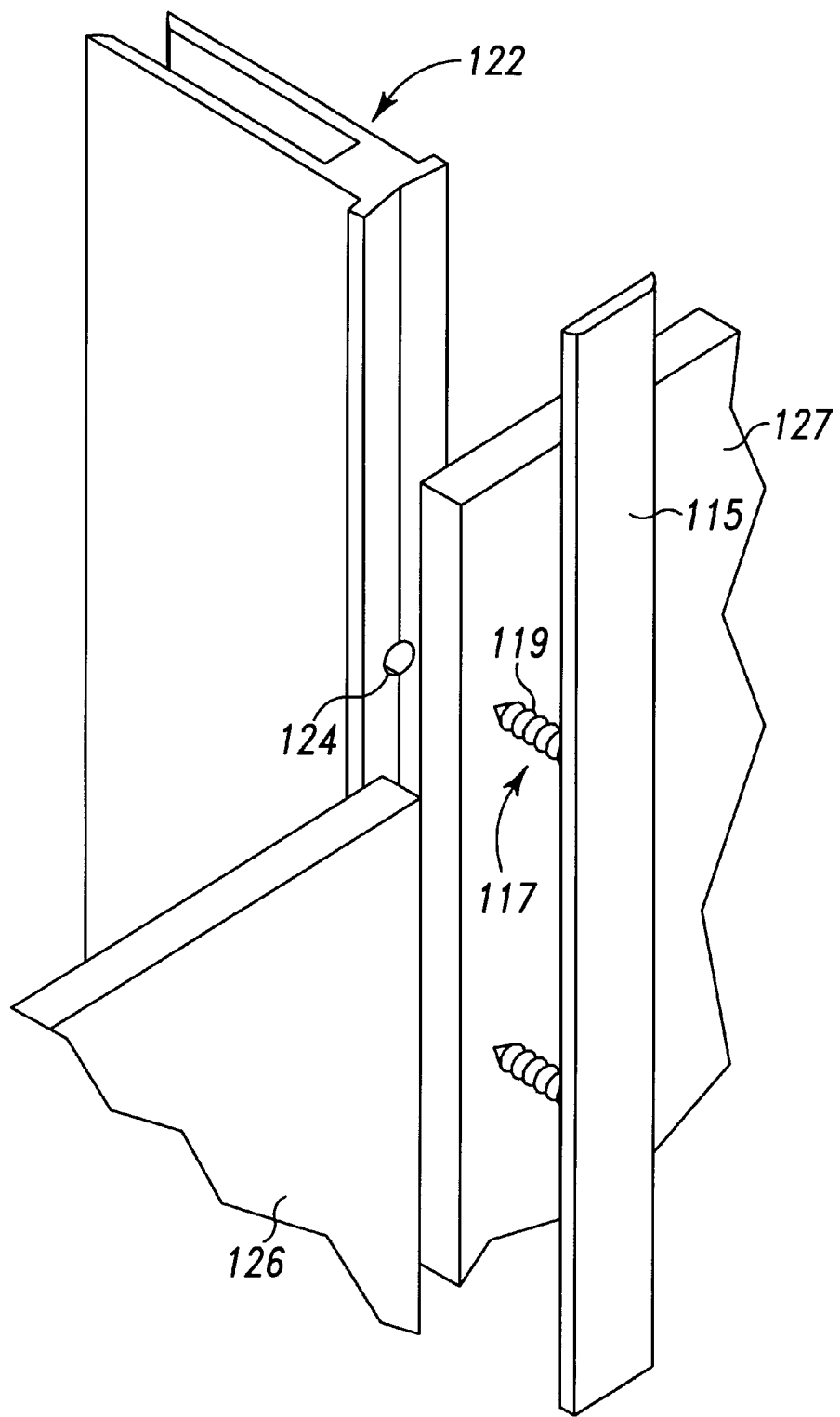
FIG. 7 is a fragmentary front perspective view of another embodiment with alternate integral bracket fasteners.

Referring now to FIG. 7, there is shown still another embodiment with fastening elements integrally formed into the front bracket. Front bracket 115 is formed of a somewhat resilient material, such as acrylic or neoprene, and is integrally provided with fastening posts 117 rearwardly projecting therefrom. Posts 117 include annular ribs 119 at spaced intervals along the post length. Rear bracket 122 includes transversely centered, cylindrical bores 124 longitudinally spaced for reception of posts 117. Annular ribs 119 have a larger diameter than bore 124 such that when a post 117 inserts within a bore 124, ribs 119 are compressibly deformed radially inwardly and forwardly toward front bracket 115. The rib compression provides a friction fit effectively securing front bracket 115 and rear bracket 122 together to maintain panels 126, 127 therebetween. It is recognized that this integral fastening posts configuration may also be employed with notched panels within the scope of the invention.

While this invention has been described as having multiple designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A rear projection screen assembly comprising:
   a plurality of rear projection screen panels, each panel having edges and a front surface and a rear surface, the panels being positioned in an adjacent relationship to form a contiguous viewing area such that each panel has at least one edge proximate the edge of an adjacent panel;
   a framing system comprising framing members disposed along proximate edges of said panels, at least one of the framing members comprising:
   a front bracket positioned along the front surfaces of the proximate edges of two panels;
   a rear bracket separate from the front bracket, the rear bracket positioned along the rear surfaces of the proximate edges of the two panels; and
   wherein one of said front bracket and said rear bracket comprises at least one projecting, slat-shaped fastening flange, said fastening flange integrally formed with said one of said front bracket and said rear bracket and passing between the proximate edges of the panels, said fastening flange arranged such that said flange extends generally parallel to the proximate edges of the two panels, said other of said front bracket and said rear bracket comprising a channel shaped complementary to said slat-shaped flange to provide a mating connection with said slat-shaped flange, said slat-shaped flange movable to an inserted position within said channel to assemble together said front bracket and said rear bracket to hold said panels therebetween, said slat-shaped flanged removable from said inserted position within said channel to disassemble said front bracket from said rear bracket.

2. The rear projection screen assembly of claim 1 wherein said fastening flange is integrally formed with said front bracket.

3. The rear projection screen assembly of claim 1 wherein said fastening flange is integrally formed with said rear bracket.

4. The rear projection screen assembly of claim 1 wherein said fastening flange comprises at least one laterally projecting rib for interlocking engagement with a rib on a wall forming said channel.

5. The rear projection screen assembly of claim 1 wherein said fastening flange extends the entire length of said one of said front bracket and said rear bracket with which it is integrally formed.

6. The rear projection screen assembly of claim 1 wherein said front bracket comprises an acrylic construction.

7. The rear projection screen assembly of claim 1 wherein said fastening flange and said channel comprise means for adjustably securing said front bracket and said rear bracket together.

8. A rear projection screen assembly comprising:

a plurality of rear projection screen panels, each panel having edges and a front surface and a rear surface, the panels being positioned in an adjacent relationship to form a contiguous viewing area such that each panel has at least one edge proximate the edge of an adjacent panel;

a framing system comprising framing members disposed along proximate edges of said panels, at least one of the framing members comprising:

a front bracket positioned along the front surfaces of the proximate edges of two panels, said front bracket comprising a forward facing surface having a length extending in a longitudinal direction and a breadth measured perpendicular to said length, wherein said forward facing surface is arranged such that said longitudinally extending length is generally parallel to said proximate edges of said two panels;

a rear bracket separate from the front bracket, the rear bracket positioned along the rear surfaces of the proximate edges of the two panels; and wherein one of said front bracket and said rear bracket comprises at least one integrally formed fastening flange having a length and width, said fastening flange length extending in said longitudinal direction and having a larger dimension than said breadth of said front bracket forward facing surface, said fastening flange passing between the proximate edges of the panels, said other of said front bracket and said rear bracket comprising a channel shaped complementary to said fastening flange to provide a mating connection with said fastening flange for connecting together said front bracket and said rear bracket.

9. The rear projection screen assembly of claim 8 wherein said fastening flange is integrally formed with said front bracket.

10. The rear projection screen assembly of claim 8 wherein said fastening flange is integrally formed with said rear bracket.

11. The rear projection screen assembly of claim 8 wherein said fastening flange comprises at least one laterally projecting rib for interlocking engagement with a rib on a wall forming said channel.

12. The rear projection screen assembly of claim 8 wherein said fastening flange extends the entire length of said one of said front bracket and said rear bracket with which it is integrally formed.

13. The rear projection screen assembly of claim 8 wherein said front bracket comprises an acrylic construction.

14. The rear projection screen assembly of claim 8 wherein said fastening flange and said channel comprise means for adjustably securing said front bracket and said rear bracket together.

15. A rear projection screen assembly comprising:

a plurality of rear projection screen panels, each panel having edges and a front surface and a rear surface, the panels being positioned in an adjacent relationship to form a contiguous viewing area such that each panel has at least one edge proximate the edge of an adjacent panel;

a framing system comprising framing members disposed along proximate edges of said panels, at least one of the framing members comprising:

a front bracket positioned along the front surfaces of the proximate edges of two panels, said front bracket extending along an entire length of each of said proximate panel edges;

a rear bracket separate from the front bracket, the rear bracket positioned along the rear surfaces of the proximate edges of the two panels and extending along the entire lengths of said proximate panel edges; and wherein one of said front bracket and said rear bracket comprises at least one projecting fastening flange, said fastening flange integrally formed with said one of said front bracket and said rear bracket and passing between the proximate edges of the panels, said fastening flange arranged such that a length of said flange extends generally parallel to the proximate edges of the two panels, said other of said front bracket and said rear bracket comprising a channel shaped complementary to a tip portion of said fastening flange to provide a mating connection with said fastening flange, said fastening flange movable to an inserted position with said tip portion within said channel to assemble together said front bracket and said rear bracket to hold said panels therebetween, said fastening flange tip portion removable from said inserted position within said channel to disassemble said front bracket from said rear bracket.

16. The rear projection screen assembly of claim 15 wherein said fastening flange is integrally formed with said front bracket.

17. The rear projection screen assembly of claim 15 wherein said fastening flange is integrally formed with said rear bracket.

18. The rear projection screen assembly of claim 15 wherein said fastening flange longitudinally extends along one of said front bracket and said rear bracket the entire lengths of said proximate panel edges.

* * * * *

UNITED STATES PATENT AND TRADEMARK OFFICE
CERTIFICATE OF CORRECTION

PATENT NO. : 5,949,576
DATED : September 7, 1999
INVENTOR(S) : Robert M. Wilson

It is certified that error appears in the above-indentified patent and that said Letters Patent is hereby corrected as shown below:

In column 4, line 4, replace "20 r" with --20,--.
In column 6, line 26, replace "lo" with --10--.
In column 7, line 3, replace "LexanW" with --Lexan™--.

Signed and Sealed this

First Day of August, 2000

Q. TODD DICKINSON

Attest:

Attesting Officer

Director of Patents and Trademarks